United States Patent [19]

Biondo, Jr.

[11] Patent Number: 5,017,953
[45] Date of Patent: May 21, 1991

[54] AUTOMATIC PHOTOGRAPHIC APPARATUS AND AUTOMATIC FRAME DISPENSING MACHINE

[75] Inventor: John V. Biondo, Jr., North Hollywood, Calif.

[73] Assignee: PVI, Inc., La Cienga Place, Calif.

[21] Appl. No.: 366,664

[22] Filed: Jun. 14, 1989

Related U.S. Application Data

[63] Continuation-in-part of Ser. No. 277,297, Nov. 29, 1988, Pat. No. 4,891,660.

[51] Int. Cl.[5] .............................................. G03B 17/50
[52] U.S. Cl. ................................................... 354/83
[58] Field of Search ................................ 354/83–87, 354/76, 75, 78, 81, 174, 290, 220

[56] References Cited

U.S. PATENT DOCUMENTS

| | | | |
|---|---|---|---|
| 3,158,523 | 11/1964 | Morrow | 354/86 X |
| 3,398,664 | 8/1968 | Bonatsos | 354/81 |
| 3,515,046 | 6/1970 | Ippolito et al. | 354/76 |
| 3,820,133 | 6/1974 | Adorney et al. | 354/76 X |
| 3,820,136 | 6/1974 | Kennedy | 354/174 X |
| 3,864,708 | 2/1975 | Allen | 354/290 |
| 4,072,973 | 2/1978 | Mayo | 354/290 X |
| 4,089,017 | 5/1978 | Baldini | 354/290 X |
| 4,647,168 | 3/1987 | Takahashi et al. | 354/174 X |
| 4,738,526 | 4/1988 | Larish | 354/76 X |

Primary Examiner—Brian W. Brown
Attorney, Agent, or Firm—Beehler & Pavitt

[57] ABSTRACT

A completely self contained photographic vending unit included within a weatherized containment automatically takes photographs of users in response to user inputs. The photographs are taken on a self-developing film supplied in cartridges. A film loading mechanism supplies and positions fresh cartridges into a camera body by conveying the fresh film cartridge from a storage unit to the camera location and then elevating the film cartridge into the camera through the bottom of the camera. The camera is aimed by tilting the entire camera assembly including the camera and film delivery mechanism as an integral unit. Frames or cards are selectively dispensed from one of a plurality of dispensing units through a delivery chute to be combined with the photograph to provide a personalized and customized greeting card, postcard or framed photograph. The entire vending unit operates automatically and unattended and may be used in an exterior location without an enclosing photographic booth.

14 Claims, 6 Drawing Sheets

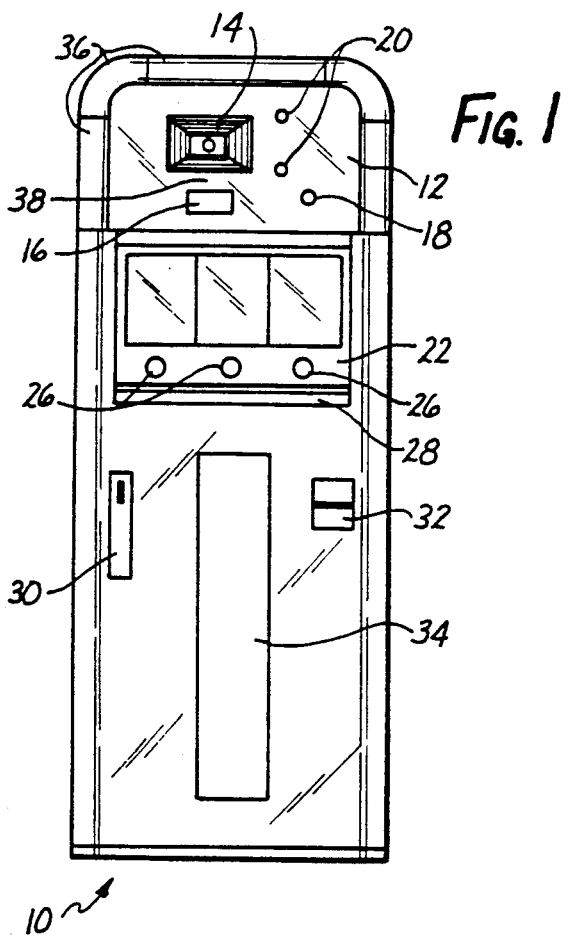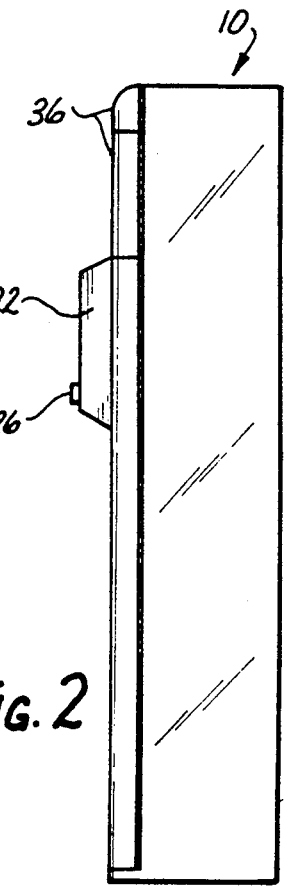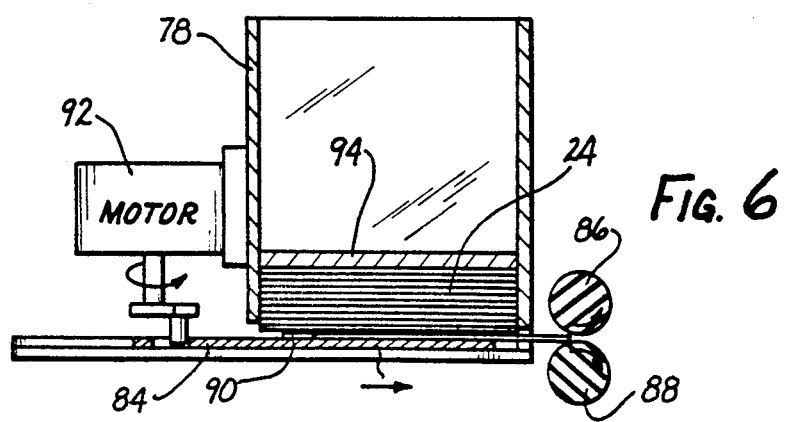

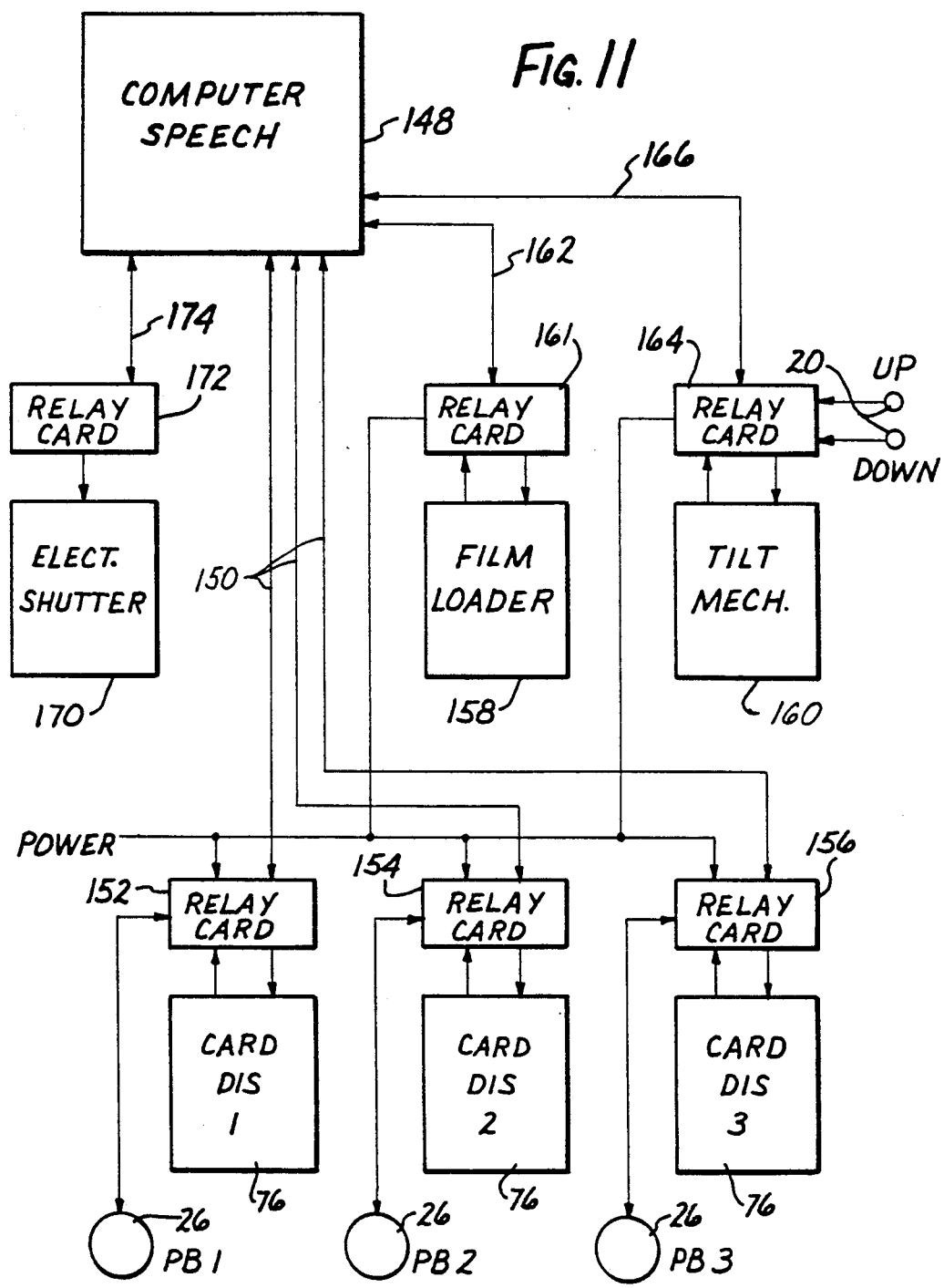

1

AUTOMATIC PHOTOGRAPHIC APPARATUS AND AUTOMATIC FRAME DISPENSING MACHINE

The present application is a continuation in part application Ser. No. 277,297, filed Nov. 29,1988, now U.S. Pat. No. 4,891,660.

BACKGROUND OF THE INVENTION

1. Field of the Invention

The invention relates generally to photographic apparatus which can be actuated to automatically take the photograph of the user or users, and then to automatically deliver a selected frame or novelty card together with the developed photograph.

2. Description of the Prior Art

Coin operated, photo-finishing booths, having fixed lens cameras, are well known. Such prior art photo-finishing booths take a series of photographs or a single photograph of an indivdual or group of individuals sitting in the booth at a fixed location in front of the camera. The photographs are then developed within the booth and dispensed to the user. The actual background is screened off by the booth and lighting is controlled within the booth. The booth serves to constrain the position and poses of the user, as well as limiting the number of persons within the field of view. The photo-finishing booth has no automatic provision for dispensing frames or cards to be combined by the user with the photograph.

Illustrative systems of automatic photography equipment can be found in U.S. Pat. Nos. 3,820,133; 3,864,708; 4,072,973; 4,089,017 and 4,738,526. These prior art photo-finishing booths show the use of self-developing equipment, such as manufactured by Polaroid Corporation and equipment which allows for the adjustment of flash intensity and coin actuation.

However, what is needed is a machine which automatically dispenses a selected decorative frame or novelty card to the user from a plurality of choices. Further, what is needed is an automatic photographic machine which is capable of automatically loading self-developing film cartidges.

BRIEF SUMMARY OF THE INVENTION

The invention is an automatic photographic apparatus for use in combination with a plurality of self-developing film cartridges containing film. The apparatus comprises a camera for the self-developing film cartidges. A film back body is provided and has two opposing sides. The film back body is coupled to the camera on one of the sides and is accessible on the opposing side for film loading. A film storage mechanism stores a plurality of film cartridges. A film loading mechanism conveys film cartridges from the film storage mechanism to the accessible side of the film back body, and loads the film cartridge into the film back body for exposure of film within the cartridge by the camera.

As a result, the apparatus is adaptable to automatically taking a plurality of self developed photographs.

The apparatus further comprises a photographic accessory storage mechanism for storing a plurality accessory items for use with the photographs taken by the apparatus. The accessory items include a picture frame, a postcard, a novelty card, or other element with which the user may wish to combine the photograph. A dispensing mechanism selectively dispenses one of the plurality of types of accessories from the accessory storage mechanism.

In the preferred embodiment the apparatus further comprises a plurality of the accessory storage mechanisms and a corresponding plurality of the dispensing mechanisms. One of the dispensing mechanism corresponds to one of the accessory storage mechanisms to selectively supply a corresponding and distinct type of accessory item from a selected one of the plurality of accessory storage mechanisms in response to a user input. Input mechanisms allow the user to make a selection among the plurality of distinct types of accessories stored within the corresponding plurality of accessory storage mechanisms.

The apparatus further comprises a camera positioning mechanism for adjustably positioning the camera in response to user inputs. A camera input positioning mechanism is provided and is adapted to activation by a user of the system.

The apparatus further comprises a weatherized containment mechanism for housing at least the camera, film back body, film storage mechanism and film loading mechanism to allow unattended and outdoor use of the apparatus.

The sides of the film back body are generally horizontal and the opposing side forms a bottom of the camera. The film loading mechanism conveys a film cartridge to a predetermined location beneath the camera and delivers the film cartridge upwardly into the bottom of the camera to a predetermined focal plane within the camera.

The apparatus further comprises a computer mechanism coupled to the camera and to film loading mechanism for control thereof for the loading of film cartridges with the camera, taking of photographs by the camera and unloading film cartridges from the camera.

The computer mechanism comprises a computer. and a plurality of relay cards. The relay cards coupled to the computer and to the camera and film loading mechanism for selectively applying power to the camera and film loading mechanism for activation and operation thereof. The apparatus further comprises user input mechanisms coupled to the plurality of relay cards to provide user determined inputs for selectively activating the camera and film loading mechanism.

In the preferred embodiment, the accessory storage mechanism comprises a plurality of accessory items in a confined stacked array, and the dispensing mechanism comprises delivery tray mechanism for dispensing one of the plurality of accessory items from the bottom of the stacked array.

In an alternative embodiment, the accessory storage mechanism comprises a plurality of accessory items in a confined stacked array and wherein the dispensing mechanism comprises delivery tray mechanism for dispensing one of the plurality of accessory items from the top of the stacked array.

The camera positioning mechanism comprises a base plate, a pivot connection coupled to the base plate about which the base plate pivots, and a tilt mechanism for moving the base plate about the pivot connection. The camera is coupled to the base plate and is selectively aimed in response to commands from the camera input mechanism.

The invention is also characterized as a method of loading and unloading film cartridges into an automatic self-developing camera comprising the steps of sequentially disposing at least one of a plurality of film cartridges on a film loading plane. At least one film cartridge is horizontally conveyed on the film loading plane to a precisely predetermined location underneath a camera body. The horizontally disposed film cartridge is vertically moved from the precisely determined position into the camera body through an access port defined in the bottom of the camera body. Shutter and exposure parameters are automatically controlled to take a photograph on self-developing film provided in the film cartridge. An exposed self-developing photograph is delivered. The film cartridge from the camera body is lowered to the film delivery plane after the photograph has been taken. The film cartridge from which the photograph has been taken is then disposed of, As a result, the plurality of cartridge loaded self-developing photographs is automatically taken.

The method further comprises the step of directing the camera by tilting the camera and film delivery plane as an integral unit about a pivot axis intersecting the optical axis of the camera.

The invention and its various embodiments are best visualized by now turning to the following drawings wherein like elements are referenced by like numerals.

BRIEF DESCRIPTION OF THE DRAWINGS

FIG. 1 is a front plan view of a free standing cabinet or vending unit incorporating the invention.

FIG. 2 is a side plan view of the vending unit of FIG. 1.

FIG. 6 is a side sectional view of the second embodiment of the card dispenser of FIG. 5 shown with a card being dispensed.

FIG. 11 is a simplified block diagram of the electronic control circuitry used for control of the vending unit illustrated in FIGS. 1-10.

Figure 3:
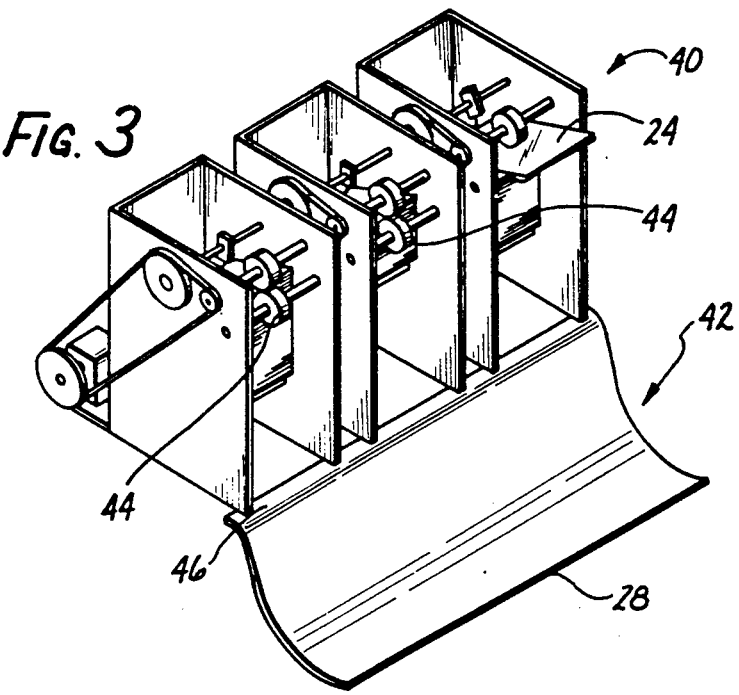
FIG. 3 is a diagrammatic depiction of a first embodiment of a card or frame dispenser according to the invention.

The invention and its various embodiments may now be understood by turning to the following detailed description.

DETAILED DESCRIPTION OF THE PREFERRED EMBODIMENT

A completely self contained photographic vending unit included within a weatherized containment for automatically takes photographs of users in response to user inputs. The photographs are taken on a self-developing film supplied in cartridges. A film loading mechanism supplies and positions fresh cartridges into a camera body by conveying the fresh film cartridge from a storage unit to the camera location and then elevating the film cartridge into the camera through the bottom of the camera. The camera is aimed by tilting the entire camera assembly including the camera and film delivery mechanism as an integral unit. Frames or cards are selectively dispensed from one of a plurality of dispensing units through a delivery chute to be combined with the photograph to provide a personalized and customized greeting card, postcard or framed photograph. The entire vending unit operates automatically and unattended and may be used in an exterior location without an enclosing photographic booth.

FIG. 1 illustrates a front elevational view of a vending unit 10 incorporating the invention. Vending unit 10 is comprised of a large free standing, weatherized cabinet including an upper display plate 12 at approximately eye level. Plate 12 may be opaque or opaque glass with the exception of a transparent viewport 14, but in any case includes a camera viewport 14 defined therein through which the lens of the camera is directed. Plate 12 may contain various printed directions and advertisements, and serves as a mounting location for various control buttons and display devices such as an LED display 16, a start button 18 and camera up and down tilt buttons 20.

Below plate 12 is a product showcase 22 which includes a window through which a plurality of decorative frames or novelty cards 24 are displayed. A corresponding selection button 26 is provided beneath each decorative frame or card 24 below which is a corresponding card dispensing slot 28. Below product showcase 22 is a conventional coin acceptor 30 and conventional bill acceptor 32. Portions of vending unit 10 may also include various decorative, flashing and colored lights or light panels such as light panel decoration 34, in the lower body portion of vending unit 10 and upper bordering light tubes 36.

The user or users approach vending unit 10 and read instructions provided on plate 12 and/or are provided with audio instructions initiated by depression of start button 18 or initiated by a proximity sensor. The users are instructed to place a certain number of bills or coins within bill acceptor 32 and coin acceptor 30 and to manipulate the up/down controls 20 to tilt a camera positioned behind camera viewport 14 until aligned with the users. Camera alignment is detected either by the user viewing himself in a one-way mirror covering the camera lens or mounted thereon and exposed through viewport 14. Alternatively, a video camera, not shown, positioned approximately parallel with the photograph camera may provide the image to a small television screen which can be appropriately mounted within plate 12 or elsewhere on the vending unit by which the user can view what the television camera, and hence what the photographic camera, is pointed at.

Once the camera is aimed at the user or users, a countdown is initiated in display 16 and the user or users positions himself or themselves in front of vending unit 10 in the desired position and poses. The photograph is then automatically taken, developed and dispensed through slot 38. The user then selects the decorative frame or card 24 with he wishes to combine with the photograph and depresses the corresponding selection button 26. The decorative frame or card 24 is then dispensed through card dispensing slot 28 and the user then combines the photograph into the card or frame.

Clearly, the frame or card may also be dispensed prior to the taking of the photograph, if desired.

Several operational features as discussed above in the present application together with other features with which it may be combined are disclosed in the applicant's copending application entitled "Automatic Photographic System and Frame Dispenser", U.S. Pat. No. 7,891,660 (1990), which is expressly incorporated herein by reference.

Turn now to a first embodiment of the card dispensing assembly as diagrammatically illustrated in perspective view in FIG. 3. The card dispensing units are shown diagrammatically in isolation from other elements of vending unit 10 for the sake of clarity of illustration. Three identical or similar card dispensing units 40 are disposed within vending unit 10 in proximity to card delivery chute 42 whose exit slot is card dispensing slot 28 shown in FIG. 1. In the illustrated embodiment of FIG. 3, each card dispensing unit 40, when selected, draws a card 24 from the top of a stack of identical cards 24, feeds the drawn card into a pair of pinch rollers 44 and thence into an entry slot 46 of delivery chute 42. The dispensed card falls through chute 42 and is delivered at delivery slot 28.

Figure 4:
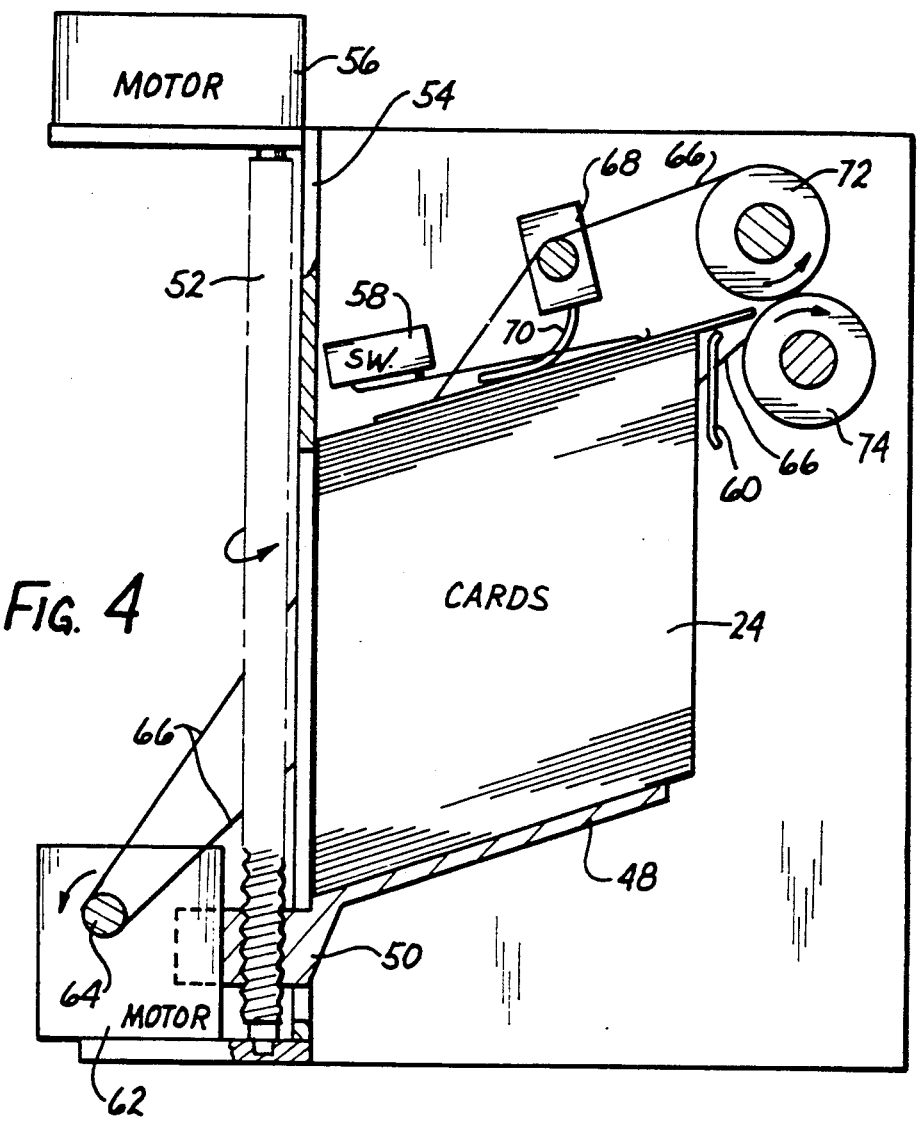
FIG. 4 is a diagrammatic side view of one of the card dispensers of FIG. 3 shown with one of the side walls removed for sake of illustration.

The detailed operation of each dispensing unit 40 as shown in the FIG. 3 can be better understood by viewing the diagrammatic side view of FIG. 4 wherein the side walls of the dispensing unit 40 have been removed for sake of clarity of illustration. The stack of card 24 is placed on a backwardly inclined lift table 48. Lift table 48 in turn is connected at its base through an extending arm 50 coupled to a threaded lead screw 52. Arm 50 is also internally threaded but is non-rotatable with respect to back 54 of dispenser 40 against which lift tables 48 slides. Lead screw 52 in turn is coupled to the drive output of electrical lift motor 56.

Lift motor 56 is selectively controlled to lift stack of cards 24 upwardly on back 54 until the uppermost card contacts microswitch 58. Microswitch 58 serves to selectively enable and disenable motor 56. When the uppermost card is in the delivery position, microswitch 12 will be activated and motor 56 disabled. This leaves the uppermost card 24 in a vertical position relative to separator 60 so that the uppermost card 24 can be moved to the right in FIG. 4 over separator 60, while the next uppermost card will be retained within the stack by separator 60, even if it tends to move forward off the top of the stack by virtue of its frictional engagement with the uppermost card.

After the uppermost or few uppermost cards are removed, switch 12 will be relieved or toggle thereby sensing the reduction in the height of the stack of cards 24. This in turn will reactivate lift motor 56 drawing lift table 48 upwardly relative to back 54 and bringing the now uppermost card once again into contact with microswitch 58. By this means, the uppermost card of the stack of cards 24 on lift table 48 are always maintained at or near the delivery position.

Cards 24 are dealt from the top of the stack shown in FIG. 4 by means of a roller motor 62. Roller motor 62 is coupled through drive wheel 64 and belt 66 to roller 68. Roller 68 in turn is coupled to a resilient flipper 70 which is rotated with the rotation of roller 68 to frictionally contact the exposed surface of the uppermost card of the stack. The counter-clockwise rotation of roller 68 rotates the flexible resilient flipper 70 thereby moving the uppermost card to the right shown in FIG. 4 toward pinch rollers 72 and 74. Pinch roller 72 in turn is coupled to belt 66 and also driven by roller motor 62. Pinch roller 74 is in frictional engagement with pinch roller 72 so that, when flipper 70 advances a card 24, pinch rollers 72 and 74 will draw a card 24 between them. The card is thus completely drawn off the top of the stack and delivered to entry slot 46 of chute 42.

Activation of roller motor 62 is ultimately controlled through activation of corresponding selection button 26 of vending unit 10.

Figure 5:
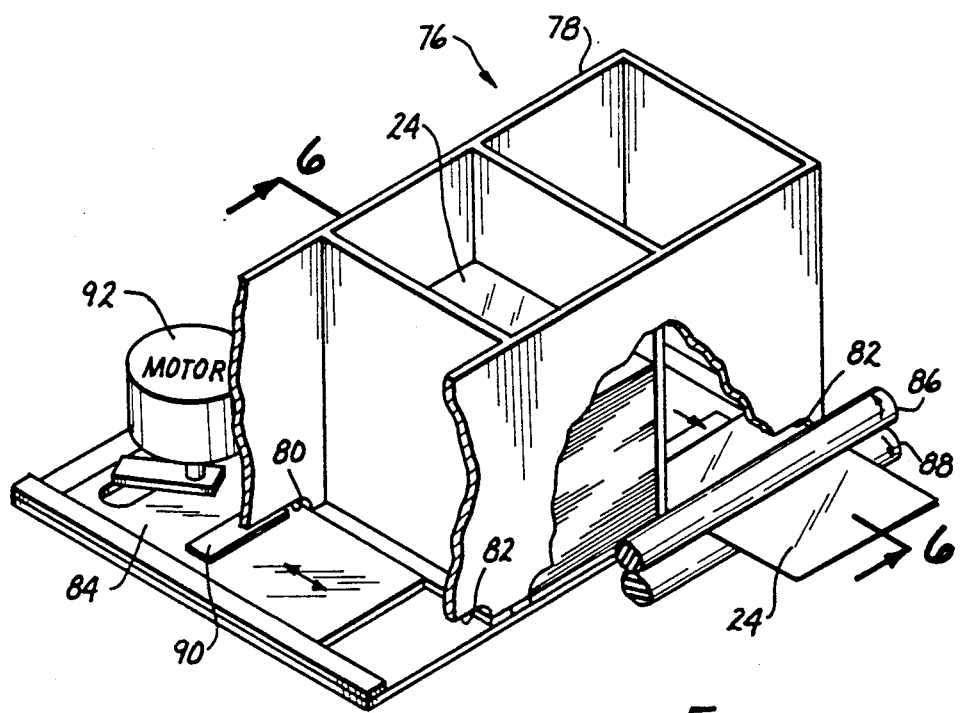
FIG. 5 is a perspective view of a second embodiment of the card dispenser of the invention showing the configuration of the dispenser prior to a card being dispensed.

Turn now to FIG. 5 which illustrates a perspective view of another and the preferred embodiment of the card dispensing mechanism. A card dispenser, generally denoted by reference numeral 76, is comprised of a four-sided housing 78 having dimensions approximating that of cards 24. A slot or gap is provided in two opposing sides of housing 78, namely a rear gap 80 and front gap 82. The dimensions of gaps 80 and 82 are just sufficient to freely allow a reciprocating delivery tray 84 to be slidingly disposed within housing 78 beneath the stack of cards 24.

The perspective view of FIG. 5 of the card dispenser shows delivery tray 84 in the fully retracted position wherein a card has not yet been dispensed. In the side sectional view of FIG. 6, delivery tray 84 is fully extended to the right in the Figure, thereby dispensing a card 24 to pinch rollers 86 and 88. Delivery tray 84 has a rectangular shim 90 disposed on its upper surface which clears rear slot 80 of housing 78 and is slightly less than the thickness of one card 24. Shim 90 thus catches the edge of the lowermost card of the stack of cards 24 within housing 78 and pushes the lowermost card forward through forward slot 82. The card continues to be pushed forward until the forward most edge is seized by pinch rollers 86 and 88 and is then carried completely forwarded and removed from dispenser 76 to the delivery chute.

Delivery tray 84 is reciprocated by means of motor 92 which is coupled to delivery tray 84 by means of a slot and pin combination. Therefore, as the lowermost card has been dispensed, delivery tray 84 moves to the left in FIG. 6 thereby allowing the next card to be positioned at the bottom of housing 78 on delivery tray 84 and to the right of shim 90. A weighted plate 94 is placed on top of the stack of cards 24 and serves to provide a minimum amount of pressure to force each of the cards to the bottom of housing 78 even to the last card.

Figure 7:
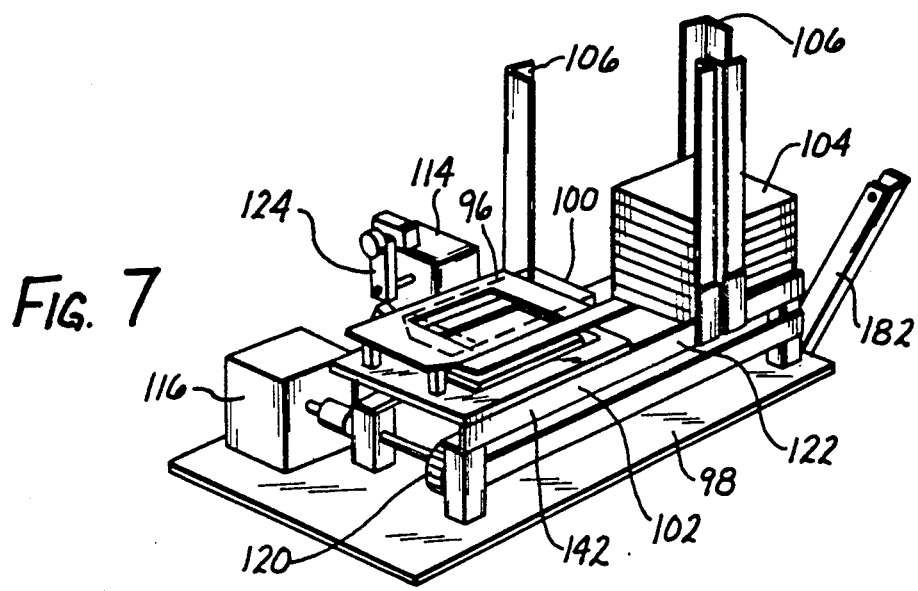
FIG. 7 is a simplified perspective view of the camera and film loading assembly of the invention.

Turn now to FIG. 7 which is a perspective view of the camera assembly of the invention wherein the camera and the film loading mechanism are located. Camera 96 is located on the left side of a base plate 98 as shown in FIG. 7 and includes a fixed focus lens 100 and film loader 102. Camera 96 also includes at least one automatically controlled exposure strobe 108 and in the illustrated embodiment two such exposure strobes are depicted.

In the illustrated embodiment, Polariod 339 film cartridges are used and loaded within a compatible film loading mechanism 102 from beneath. Again in the illustrated embodiment, film loading mechanism 102 is a modified version of a Polaroid 339 film loading case which has its rear cover removed, modified or cut to allow insertion of a Polaroid 339 film cartridge from beneath. Normally, the Polaroid 339 film loader has its mating film cartridges loaded from a side slot. In the present illustrated embodiment the conventional side slot is not utilized.

Film cartridges, such as Polaroid 339 film cartridges, are stored in a dual cartridge chute generally denoted by reference numeral 106. In the illustrated embodiment chute 106 is shown as being comprised of two rectangular sheet metal cases sharing a common wall and each having a cross-sectional dimension approximating the dimensions of film cartridges 140. However, it must be expressly understood that other forms of cartridge chute 106 are include within the scope of the invention. For example, instead of the rectangular casings shown in FIG. 7, a plurality of vertically disposed angle irons forming the corner of the cartridge chute could be alternatively employed.

Figure 8:
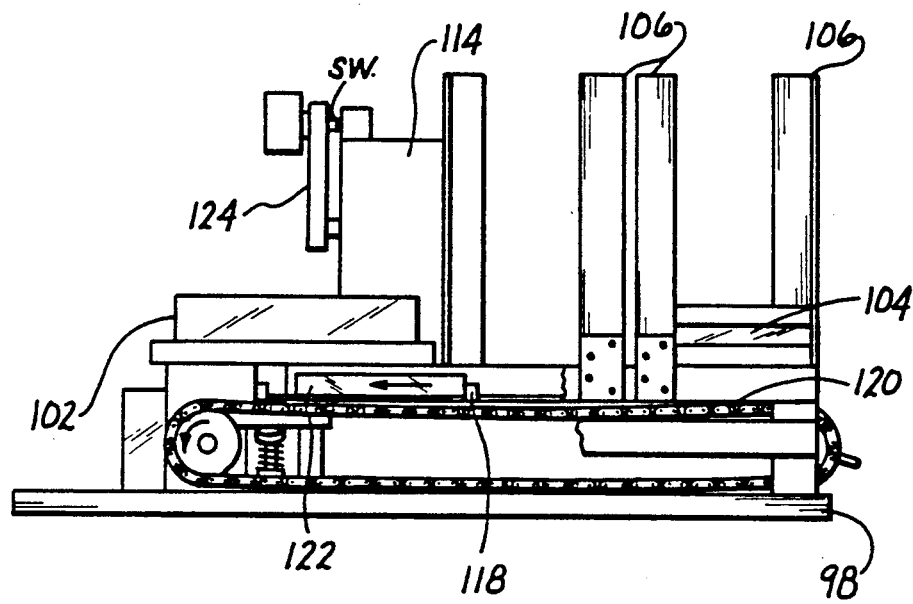
FIG. 8 is a front elevational view of the camera and film loading assembly shown in FIG. 7 with the camera removed.
Figure 9:
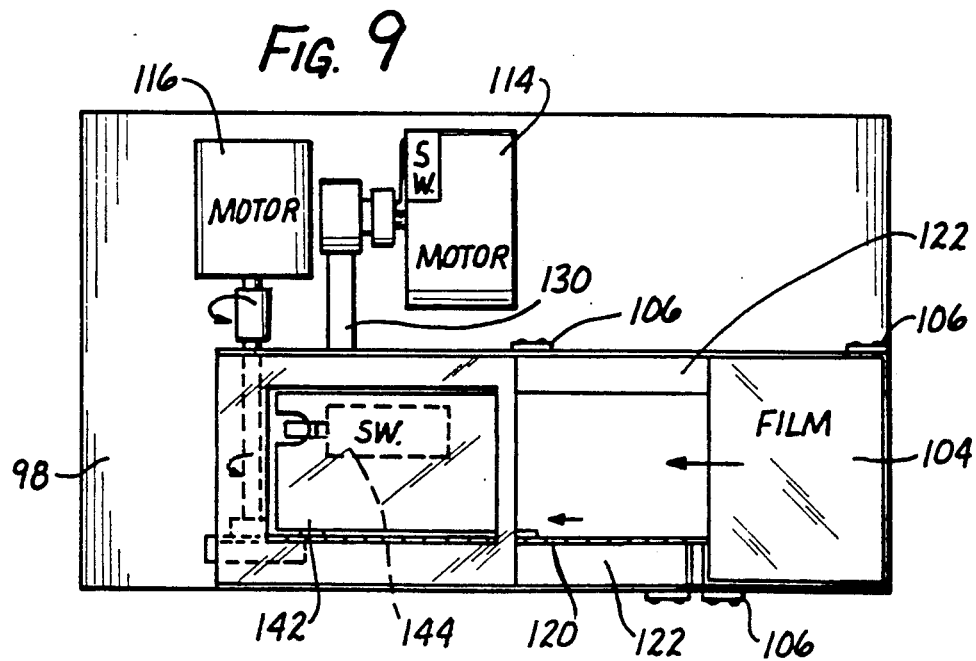
FIG. 9 is a top elevational view of the camera and film loading assembly shown in FIG. 8.

Film cartridges 104 are selectively moved from dual cartridge chute 106 on a conveyor underlying base plate 98 shown in greater detail in FIGS. 8 and 9 and loaded through the bottom of camera 96. The photograph is taken and expelled through a front delivery slot 110 on film back 102 to a film delivery chute 112 ultimately for delivery through slot 38 on the front of vending unit 10. An elevator motor 114 is utilized in the camera assembly of FIG. 7 to raise and lower a film cartridge 104 into and out of film back 102. A conveyor motor 116 is utilized to selectively move film cartridges 104 from cartridge chute 106 to the camera position for loading.

Figure 10:
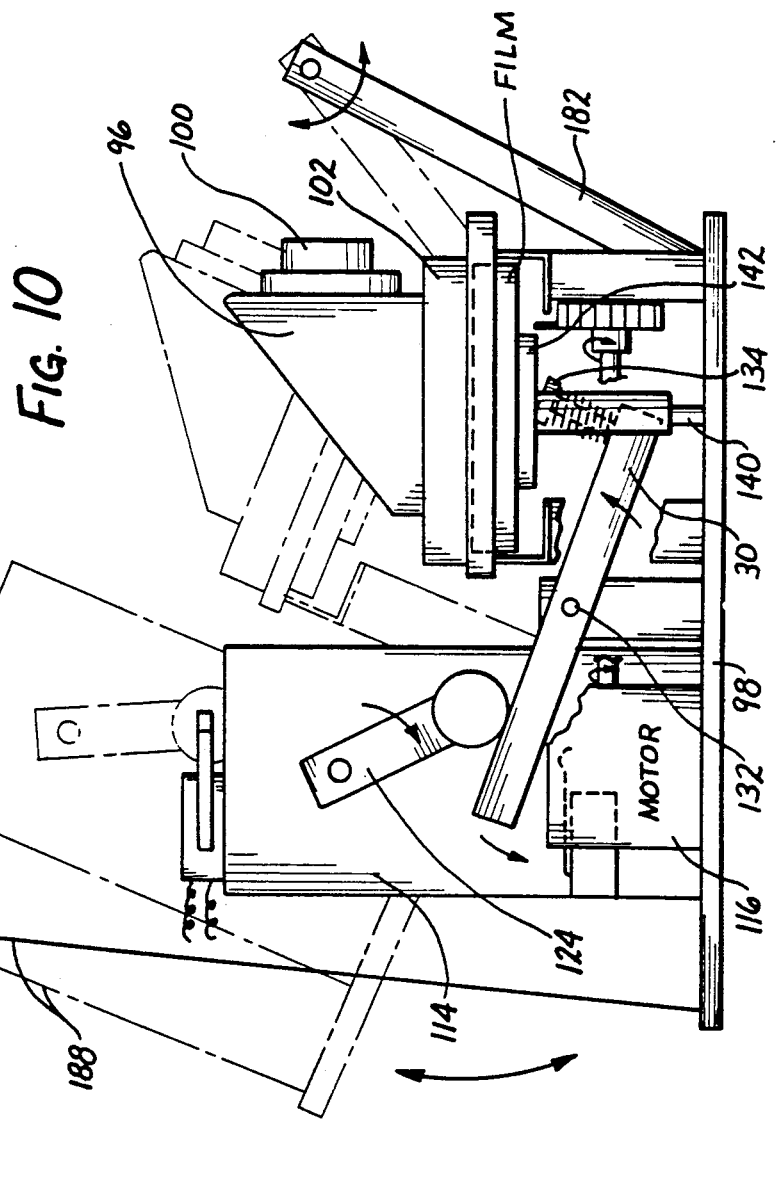
FIG. 10 is an end elevational view of the camera and film loading assembly shown in FIGS. 7-9 with the camera body shown in place.

The operation of the camera and film loader can be better understood by now turning to the depictions of FIGS. 8-10. FIG. 8 is a front side view of the conveyor assembly, FIG. 9 a top view of the conveyor assembly with the camera body removed for sake of illustration, and FIG. 10 an end view of the conveyor assembly illustrating the tilt mechanism of base plate 98.

Turning first to FIG. 8, it can be seen that the stack of cartridges 104 are aligned within cartridge chutes 106 but rest upon guide rails 97 which in turn on mounted on a base plate 98. An endless chain including a plurality of teeth 118 is disposed on one side of guide rails 97 so that when belt 120 is driven, a tooth 118 carried by chain 120 will, for example, contact the right edge of the rightmost cartridge in the right cartridge chute 106 and move the cartridge from the right delivery chute to the left delivery chute.

A corresponding tooth 118 on chain 120 meanwhile contacts the right edge of the bottom most cartridge in the left delivery chute 106 shown in FIG. 8 and moves that cartridge to the left underneath film back 102.

When the cartridge 104 is exactly positioned underneath film back 102, its left edge activates a microswitch 122. Activation of microswitch 122 disables conveyor motor 116 thereby stopping chain 120 and activating elevator motor 114. Elevator motor 114 rotates arm 124 away from microswitch 126 until it contacts end 128 of lever arm 130. Lever arm 130 is pivoted about pivot 132. A spring loaded pedestal 134 is mounted on the opposing end 136 of lever 130. Continued rotation of arm 124 continues to rotate lever 130, thereby bringing pedestal 134 against elevator bar 138. Elevator bar 138 is guided by a pair of opposing posts 140 fixed to base plate 98. Bar 138 is connected to elevator plate 142 upon which a fresh film cartridge 104 has just been delivered.

Arm 124 continues to rotate, thereby causing rotation of lever 130 and upward displacement of elevator plate 142 carrying film cartridge 104 into film back 102. When lever arm 130 has been rotated to cause elevator plate 142 and its corresponding film cartridge to be correctly inserted through the back of film back 102, end 128 of arm 130 contacts microswitch 144. Microswitch 144 then disables elevator motor 114 and signals the computer within the vending unit, as described below in greater detail in connection with FIG. 11, that the camera has been appropriately loaded with film.

Thereafter, camera 96 is operated by the computer in a conventional manner to take, develop and deliver a photograph.

After the photograph has been taken and delivered, film cartride 104 within film back 102 is functionally empty and must be removed. The computer reactivates elevator motor 114 thereby causing arm 124 to rotate back toward microswitch 122 and permitting arm 130 to rotate back to its initial position thus allowing elevator platform 142 to move downwardly, bringing the expended film cartridge 104 with it. When arm 124 again reaches microswitch 126, the film cartridge will be redisposed in a plane of conveyor chain 120 and teeth 118 on guide rails 97. Activation of switch 126 thus indicates that the conveyor system can be reactivated and conveyor motor 116 is then turned on. The same booth which had brough film cartridge 104 into the delivery position for insertion into film back 102 remains in place and is then moved to the left in FIG. 8, taking the used film cartridge 104 to the left and delivering it off the end of the conveyor chain 120 into a receiving cartridge bucket 146 located appropriately below and to the side of the camera assembly as best shown in FIG. 8.

Release of microswitch 122 indicates that the expended cartridge has been successfully removed form the loading area of the conveyor behind film back 102. Meanwhile, a successive tooth 118 of conveyor chain 120 brings the next cartridge from cartridge chuts 106 into position to reactivate microswitch 122 to begin the cycle anew.

As cartridges 104 are removed from cartridge chute 106, the weight of the cartridges is sufficient to feed the next cartridge into position on the conveyor plane on guide rails 97. Since cartridges are removed from the bottom of the rightmost chute 106 and moved to the left to replace the lowermost cartridge in the leftmost chute 106, the right cartridge chute is emptied first. After the rightmost cartridge chute is empty, the remaining cartridges in the leftmost chute are then used until depleted.

Turn now to the circuitry of FIG. 11, wherein the elements of FIGS. 1-10 are operatively coordinated. The computer, generally denoted by reference numeral 148, is a conventional computer including a central processing unit, memory, input and output devices and other peripheral devices such as a speech chip and speaker. Computer 148 is conventional and therefore will not be further discussed beyond what is necessary to describe the overall operation of the invention.

Computer 148 communicates with various electromechanical elements illustrated in FIGS. 1-10 by means of low voltage command or logic signals used to control a plurality of corresponding relay cards. 110 volt power is then supplied to the relay cards to provide the necessary driving voltages and currents to each device.

For example, command lines 150 are coupled from the input/output of computer 148 to relay cards 152-156. Pushbuttons 26 in the front of vending unit 10 are also coupled to or through relay cards 152-156 to allow the user to indicate which of the card dispensers is to be activated by computer 148. After the use has made his selection through pushbutton 26, the selected one of relay cards 152-156 is activated. This then provides the necessary power to each of the motors in the card dispensers, here illustrated as the card dispenser 76 of the embodiments of FIG. 5 and 6.

Similarly, the film loading mechanism described in connection with FIGS. 7–9 symbolically denoted in FIG. 11 as a film loader assembly 158 is accessed through relay card 161. Relay card 161 in turn is coupled to computer 148 through command lines 162 to appropriately power the elevator motor 114, conveyor motor 116 or tilt access motor 180 according to the protocol described in connection with FIGS. 7–9.

FIG. 10 shows an end sectional view which best illustrates the tilt function of the camera assembly. Base plate 98 is fixed to a pair of angled struts 182 angled forward and upwardly from base plate 98. The opposing end 184 of each strut 182 is connected by means of a pivot 186 to the frame or an interior wall of vending unit 10. Thus, the entire camera assembly is pivoted about pivots 186. Vertical adjustment of pivots 186 are chosen to be approximately aligned with the vertical position of lens 100 of camera 96.

The opposing of rear edge of base plate 98 is connected to a cable 188. The opposing end of cable 188 in turn is wound about a pulley 190 driven by tilt motor 180. Therefore, the tilt and thus the direction of lens 100 of camera 96 is adjusted either upwardly or downwardly according to the amount of cable 188 pulled up or released from pulley 190 under the control of motor 180.

The tilt mechanism, symbolically denoted by reference numeral 160 in FIG. 11, is similarly accessed through relay card 164. Relay card 164 in turn is connected through an input/output line 166 as well as tilt direction commands communicated on lines 168 from the up and down buttons 20 located on the front of vending unit 10.

Finally, the electrical activation of camera 96, namely its electrical shutter, symbolically denoted by reference numeral 170 in FIG. 11, is similarly accessed through relay card 172 by means of a bidirectional command line 174 connected to computer 148.

Therefore, appropriate activation of one of the motors within vending unit 10 is subject to the command of computer 148 and the input selections of the user through buttons 20 or 26 are all provided as selected command signals to relay cards corresponding to and providing the necessary power for the electromechanical mechanisms which implement the selected function.

Many modifications and alterations may be made by those having ordinary skill in the art without departing from the spirit and scope of the invention. Therefore, it must be understood that the illustrated embodiment has been set forth only for the purposes of example and clarity and should not be read as limiting the invention as defined in the following claims. The invention as claimed expressly includes not only the literal elements claimed, but all equivalents thereto which function in any manner to obtain the same result.

I claim:

1. An automatic photographic apparatus for use in combination with a plurality of self-developing film cartridges containing film comprising:
   a camera for said self-developing film cartridges;
   a film back body coupled to said camera and being accessible for film loading;
   a film storage means for storing a plurality of film cartridges in a plurality of stacks; and
   nonreciprocating film loading means for conveying film cartridges from said film storage means to said film back body, and for loading said film cartridge into said film body for exposure of film within said cartridge by said camera, said film loading means comprising a continuous and nonreversing belt disposed with a plurality of tabs disposed under said plurality of stacks of said film cartridges, said tabs being arranged and configured to contact successive ones of said film cartridges from said film storage means, said tabs and continuous belt moving said film cartridges into operative position with respect to said film back body without said film cartridges necessarily contacting one another,
   whereby said apparatus is adaptable to automatically taking a plurality of self developed photographs.

2. An automatic photographic apparatus for use in combination with a plurality of self-developing film cartridges containing film comprising:
   a camera for said self-developing film cartridges;
   a film back body, said film back body having two sides coupled to said camera on one of said sides and being accessible to film loading at one of said two sides;
   a film storage means for storing a plurality of film cartridges;
   film loading means for conveying film cartridges from said film storage means to said one side of said film back body, and for loading said film cartridge into said film back body for exposure of film within said cartridge by said camera;
   photographic accessory storage means for storing a plurality of accessory items for use with said photographs taken by said apparatus; and
   dispensing means for selectively dispensing one of said plurality of types of accessories from said accessory storage means,
   whereby said apparatus is adaptable to automatically taking a plurality of self developed photographs.

3. The apparatus of claim 2 further comprising:
   a plurality of said accessory storage means;
   a corresponding plurality of said dispensing means, one said dispensing means corresponding to one of said accessory storage means to selectively supply a corresponding and distinct type of accessory item from a selected one of said plurality of accessory means in response to a user input; and
   input means for allowing the user to make a selection among said plurality of distinct type of accessories stored within said cooresponding plurality of accessory storage means.

4. The apparatus of claim 2 further comprising:
   camera positioning means for adjustable positioning said camera in response to user inputs; and
   camera input positioning means adapted to activation by a user of said system.

5. The apparatus of claim 2 further comprising a weatherized containment means for housing at least said camera, film back body, film storage means and film loading means to allow unattended and outdoor use of said apparatus.

6. The apparatus of claim 4 further comprising a weatherized containment means for housing at least said camera, film back body, film storage means and film loading means to allow unattended and outdoor use of said apparatus.

7. The apparatus of claim 2 wherein said sides of said film back body are generally horizontal and form a bottom of said camera, said film loading means conveying a film cartridge to a predetermined location beneath said camera and delivering said film cartridge upwardly into said bottom of said camera at a predetermined focal plane within said camera.

8. The apparatus of claim 1 further comprising computer means coupled to said camera and to film loading means for control thereof for the loading of film cartridges within said camera, taking of photographs by said camera and unloading film cartridges from said camera.

9. The apparatus of claim 8 wherein said computer means comprises a computer, and a plurality of relay cards, said relay cards coupled to said computer and to said camera and film loading means for selectively applying power to said camera and film loading means for activating and operation thereof.

10. The apparatus of claim 9 further comprising user input means coupled to said plurality of relay cards to provide user determined inputs for selectively activating said camera and film loading means.

11. The apparatus of claim 2 further comprising computer means coupled to said camera, and film loading means for control thereof for the loading of film cartridges within said camera, taking of photographs by said camera and unloading film cartridges from said camera;

wherein said computer means comprises a computer, and a plurality of relay cards, said relay cards coupled to said computer and to said camera and film loading means for selectively applying power to said camera and film loading means for activation and operation thereof; and further comprising user input means coupled to said plurality of relay cards to provide user determined inputs for selectively activating said camera and film loading means.

12. The apparatus of claim 2 wherein said accessory storage means comprises a plurality of accessory items in a confined stacked array and wherein said dispensing means comprises delivery tray means for dispensing one of said plurality of accessory items from the bottom of said stacked array.

13. The apparatus of claim 2 wherein said accessory storage means comprises a plurality of accessory items in a confined stacked array and wherein said dispensing means comprises delivery tray means for dispensing one of said plurality of accessory items from the top of said stacked array.

14. An automatic photographic apparatus for use in combination with a plurality of self-developing film cartridges containing film comprising:

a camera for said self-developing film cartridges;

a film back body having two opposing sides, said film back body coupled to said camera on one of said sides and being accessible on said opposing side for film loading;

a film storage means for storing a plurality of film cartridges;

film loading means for conveying film cartridges from said film storage means to said accessible side of said film back body, and for loading said film cartridges into said film back body for exposure of film within said cartridges by said camera;

photographic accessory storage means for storing a plurality of accessory items for use with said photographs taken by said apparatus;

dispensing means for selectively dispensing one of said plurality of types of accessories from said accessory storage means;

camera positioning means for adjustably positioning said camera in response to use inputs;

camera input positioning means adapted to activation by a user of said system; and computer means coupled to said camera, and film loading means for control thereof for the loading of film cartridges from said camera, taking of photographs by said camera and unloading film cartridges from said camera, whereby said apparatus is adaptable to automatically taking a plurality of self developed photographs.

* * * * *